United States Patent
Beyo et al.

(10) Patent No.: US 12,406,053 B2
(45) Date of Patent: Sep. 2, 2025

(54) ASSESSING DATA SECURITY OF A MANAGED DATABASE DEPLOYED IN THE CLOUD USING A SECURED SANDBOX ENVIRONMENT

(71) Applicant: Imperva, Inc., San Mateo, CA (US)

(72) Inventors: Gabriel Beyo, Modiin (IL); Tal Shabi, Natanya (IL); Eytan Shalom Naim, Modiin (IL); Elad Erez, Rehovot (IL); James Arthur Burtoft, Bellefonte, PA (US); Paul Aiuto, Miller Place, NY (US)

(73) Assignee: Imperva, Inc., San Mateo, CA (US)

( * ) Notice: Subject to any disclaimer, the term of this patent is extended or adjusted under 35 U.S.C. 154(b) by 338 days.

(21) Appl. No.: 17/814,496

(22) Filed: Jul. 22, 2022

(65) Prior Publication Data
US 2023/0025740 A1   Jan. 26, 2023

Related U.S. Application Data

(60) Provisional application No. 63/224,830, filed on Jul. 22, 2021.

(51) Int. Cl.
*G06F 21/53* (2013.01)
*G06F 21/57* (2013.01)

(52) U.S. Cl.
CPC ............ *G06F 21/53* (2013.01); *G06F 21/577* (2013.01); *G06F 2221/034* (2013.01); *G06F 2221/2141* (2013.01)

(58) Field of Classification Search
CPC ............................... G06F 21/53; G06F 21/577
USPC .......................................................... 726/23
See application file for complete search history.

(56) References Cited

U.S. PATENT DOCUMENTS

2020/0358818 A1* 11/2020 Stoletny .............. G06F 21/566
2022/0360830 A1* 11/2022 Wang ................. H04N 21/2187

* cited by examiner

*Primary Examiner* — Anthony D Brown

(57) ABSTRACT

A method performed by a cloud computing platform of a cloud service is disclosed to assess a data security of a database deployed in a cloud environment associated with a user of the cloud service. The method includes creating a sandbox environment in the cloud environment associated with the user, loading scanner code in the sandbox environment, wherein the scanner code includes code for performing a data security assessment, loading and restoring a snapshot of the database in the sandbox environment, setting a unique password for admin access to the restored snapshot of the database, executing the scanner code in the sandbox environment to perform the data security assessment on the restored snapshot of the database, and tearing down the sandbox environment in response to a determination that the scanner code has finished execution.

17 Claims, 6 Drawing Sheets

ASSESSING DATA SECURITY OF A MANAGED DATABASE DEPLOYED IN THE CLOUD USING A SECURED SANDBOX ENVIRONMENT

CROSS-REFERENCE TO RELATED APPLICATIONS

This application claims the benefit of U.S. Provisional Application No. 63/224,830, filed Jul. 22, 2021, which is hereby incorporated by reference.

TECHNICAL FIELD

Embodiments of the invention relate to the field of data security, and more specifically to assessing the data security of a database deployed in the cloud using a secured sandbox environment.

BACKGROUND

"Cloud" services provide shared resources, software, and information to computers and other electronic devices upon request. In cloud environments, software can be accessible over the internet rather than installed locally on in-house (or "on-premise") computer systems. Cloud services typically involve on-demand, over-the-internet provision of dynamically scalable and often virtualized resources. Technological details can be abstracted from the users, who no longer need expertise in, or control over, the technology infrastructure "in the cloud" that supports them.

A cloud service (e.g., Amazon Web Services (AWS), Microsoft Azure, and Google Compute Engine) may include a managed database service that allows users to easily set up, operate, and scale databases in the cloud. Due to the various benefits that the cloud provides (e.g., scalability, reduced operational/maintenance costs, and agility), an increasing number of databases are being deployed in or moved to the cloud. The databases deployed in the cloud may store various potentially sensitive/private information such as personally identifiable information (PII), credit card information, and passwords. Thus, it is important that users of a managed database service ensure that the data stored in their databases are properly secured.

A security vendor may develop and provide a data security assessment tool that can perform a data security assessment of a database deployed in the cloud. One approach for a data security assessment tool to perform a data security assessment of a database deployed in the cloud is to obtain information about the database over a public or private network via an application programming interface (API) (e.g., provided by the cloud service and/or the owner of the database) and analyze that information. However, a drawback of this approach is that it is limited to analyzing information that is exposed by the API, which typically does not include complete information about the database (e.g., it typically does not include database metadata, columns, system tables, and/or data stored in certain database tables). As a result, the data security assessment tool may not be able to perform a "deep" scan of the database. Another approach is for the database owner to give the database assessment tool access to its database (e.g., using a special machine such as a jump server) and allow it to perform queries on the database. However, a drawback of this approach is that the queries may harm the production data (e.g., due to an error) and/or the queries may affect database performance.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
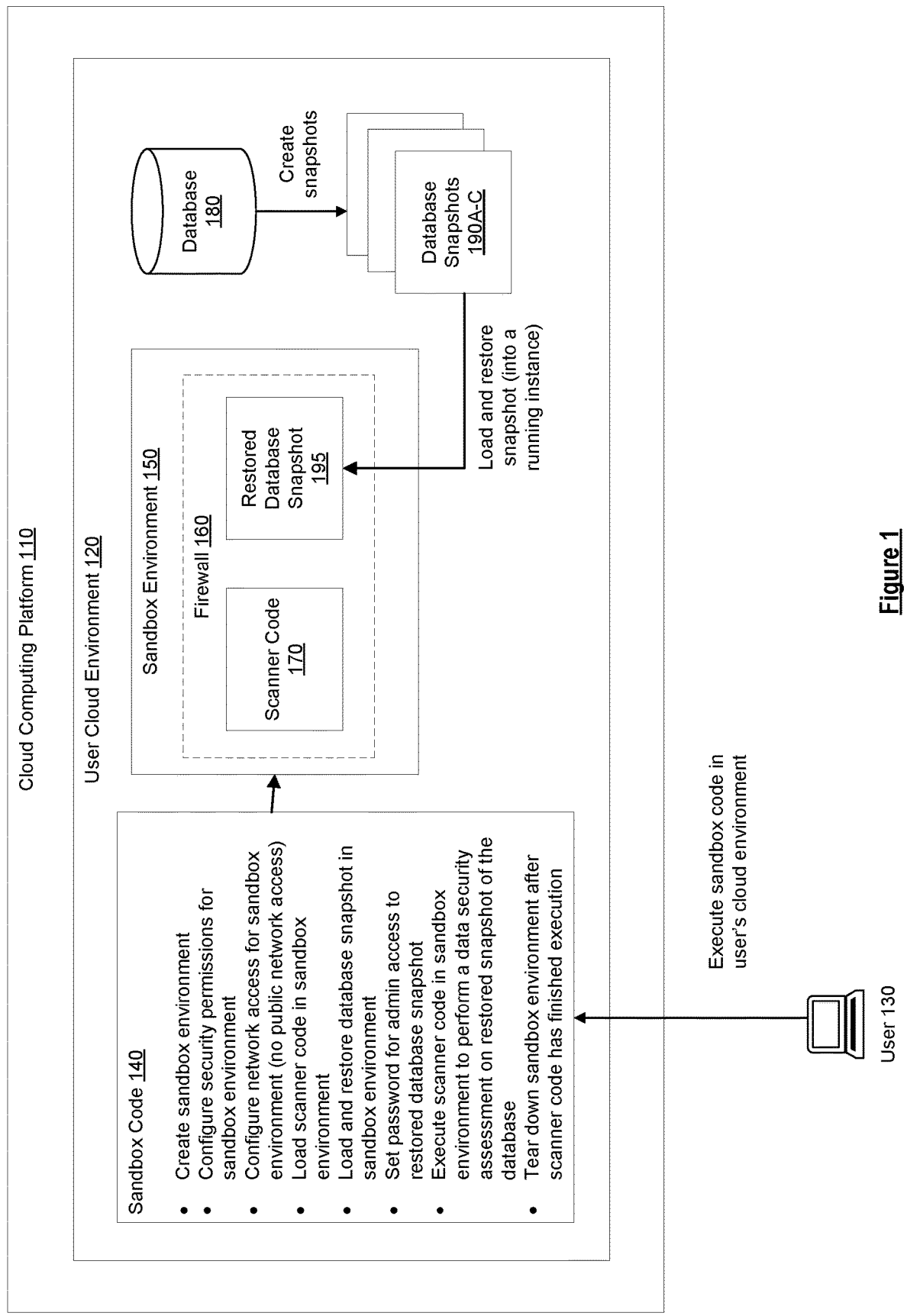
FIG. 1 is a block diagram of a system for assessing the data security of a database deployed in the cloud using a sandbox environment, according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims (or example embodiments), the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

A database is an organized collection of data stored and accessed electronically from a computer system. Databases may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store (also known as document-oriented as they store document-oriented information, which is also known as semi-structured data). A database may comprise one or more database objects that are managed by a database management system (DBMS), each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the record belongs.

As mentioned above, a security vendor may develop and provide a data security assessment tool that can perform a data security assessment of a database deployed in the cloud. One approach for a data security assessment tool to perform a data security assessment of a database deployed in the cloud is to obtain information about the database over a public or private network via an application programming interface (API) (e.g., provided by the cloud service and/or the owner of the database) and analyze that information. However, a drawback of this approach is that it is limited to analyzing information that is exposed by the API, which typically does not include complete information about the database (e.g., it typically does not include database metadata, columns, system tables, and/or data stored in certain database tables). As a result, the data security assessment tool may not be able to perform a "deep" scan of the database. Another approach is for the database owner to give the database assessment tool access to its database (e.g., using a special machine such as a jump server) and allow it to perform queries on the database. However, a drawback of this approach is that the queries may harm the production data (e.g., due to an error) and/or the queries may affect database performance.

Embodiments provide a way to assess the data security of a database deployed in the cloud in a secure and private manner while having access to all (or most of) the data of the database. Embodiments achieve this by programmatically creating a secure sandbox environment in the database owner's cloud environment (e.g., using the database owner's cloud service account), loading and restoring a snapshot of the database in the sandbox environment (into a running instance), and performing a data security assessment on the restored snapshot of the database (which represents the state of the original database at the time the snapshot was taken).

An embodiment is sandbox code that a security vendor may provide to a user of a cloud service to assess the data security of a database deployed in the user's cloud environment. The user may execute the sandbox code in the user's cloud environment (e.g., using the user's cloud service account). Execution of the sandbox computer code may involve creating a secure sandbox environment in the user's cloud environment (where the sandbox environment is configured such that it has no network access to a public network such as the internet and that no objects/appliances outside of the sandbox environment can communicate with objects inside the sandbox environment), loading scanner code for performing a data security assessment in the sandbox environment, loading and restoring a snapshot of the database in the sandbox environment, executing the scanner code in the sandbox environment to perform the data security assessment on the restored snapshot of the database, and tearing down the sandbox environment in response to a determination that the scanner code has finished execution. Performing the data security assessment may involve running database posture tests, running common vulnerabilities and exposures (CVE) tests, running assessment tests via direct database queries, and/or running data classification algorithms. The results of performing the data security assessment may be stored in a data storage in the cloud that is accessible to the user.

An advantage of embodiments described herein is that they perform a data security assessment in a secure sandbox environment in the user's cloud environment, thereby avoiding or significantly reducing the outside exposure of the user's data. Also, embodiments perform a data security assessment on a restored snapshot of the database instead of on the production version of the database, which helps ensure that the production database is not harmed (e.g., accidentally or maliciously) and minimizes the impact on the performance of the production database. Another advantage of embodiments described herein is that they are able to perform a "deep" database scan because they have access to the entire snapshot of the database (e.g., in contrast to existing approaches that rely on the information exposed by an API of the database) (e.g., embodiments may be able to access actual data, database roles information, database user information, system tables, and/or database session information). Additionally, traditional data security assessment tools (e.g., database scanners) require credentials per database to access its data, while embodiments may access restored snapshots without supplying database user name or password. Other advantages will be apparent to one of ordinary skill in the art in view of the present disclosure. Embodiments will now be described with reference to the accompanying figures.

FIG. 1 is a block diagram of a system for assessing the data security of a database deployed in the cloud using a sandbox environment, according to some embodiments. As shown in the diagram, the system includes a cloud computing platform 110 of a cloud provider. The cloud provider (not shown) may operate and manage the cloud computing platform 110 to provide a cloud service to users such as user 130. The users may access the cloud service (e.g., using a client computing device such as a desktop, laptop, tablet, smartphone, etc.) over a public network such as the internet. For sake of illustration, a single user 130 is depicted in the diagram. It should be understood, however, that a cloud service will typically have multiple users. The cloud computing platform 110 may include various hardware, software, and/or other infrastructure that are needed for providing the cloud service to users. Examples of cloud providers include Amazon Web Services (AWS), Microsoft Azure, and Google Compute Engine. In one embodiment, the cloud service includes a managed database service that allows users to easily set up, operate, and scale databases in the cloud computing platform 110 ("in the cloud"). An example of a managed database service is Amazon Relational Database Service (RDS).

As shown in the diagram, the cloud computing platform 110 includes a user cloud environment 120. The user cloud environment 120 is a logical partition of the cloud computing platform 110 that is allocated to the user 130 (i.e., it is associated with the user's cloud service account). The user cloud environment 120 may include a database 180 that is provided as part of a managed database service. In one embodiment, the managed database service automatically creates scheduled snapshots of the database 180 for backup and recovery purposes (e.g., daily snapshots). For example, as shown in the diagram, the managed database service may create snapshots of the database 180 in the form of database snapshots 190A-C. For sake of illustration, three snapshots are depicted in the diagram. It should be understood, however, that there can be more or less snapshots than shown in the diagram. Also, although not shown in the diagram, the cloud computing platform 110 may include user cloud environments (similar to user cloud environment 120) for other users of the cloud service (each associated with that user's cloud service account).

Depending on the use of the database 180, it may store various potentially sensitive/private information such as personally identifiable information (PII), credit card information, and passwords. Thus, it is important that the user 130 ensures that the data stored in the database 180 is properly secured.

In one embodiment, a security vendor may provide computer code 140 ("sandbox code") to the user 130 for assessing the data security of the user's database 180. The user 130 may then execute this sandbox code 140 in their cloud environment (e.g., user cloud environment 120). In one embodiment, the user 130 may do this by submitting the sandbox code 140 to the cloud service (e.g., as a ZIP file or a container image) using the user's cloud service account to be executed on the cloud computing platform 110 in a "serverless" manner (e.g., using a serverless computing service such as Amazon Lambda).

As shown in the diagram, the sandbox code 140 may include code for creating a sandbox environment 150 in the user cloud environment 120, configuring security permissions for the sandbox environment, and configuring network access (e.g., configuring routing tables and firewall) for the sandbox environment. The sandbox environment 150 may be a user-configurable virtual private networking environment. In one embodiment, the sandbox environment 150 is a virtual private cloud (e.g., an Amazon VPC). The security permissions and the network access for the sandbox environment 150 may be configured such that the sandbox environment 150 only has the necessary permissions to perform a data security assessment in accordance with embodiments disclosed herein and has no inbound or outbound network access to a public network such as the internet. In one embodiment, the sandbox environment 150 is configured to include a firewall 160 that limits/prevents network access across the firewall 160 (e.g., prevents network traffic to and from the internet and prevents local network traffic to any objects (e.g., a running instance of a database snapshot) behind the firewall).

Figure 2:
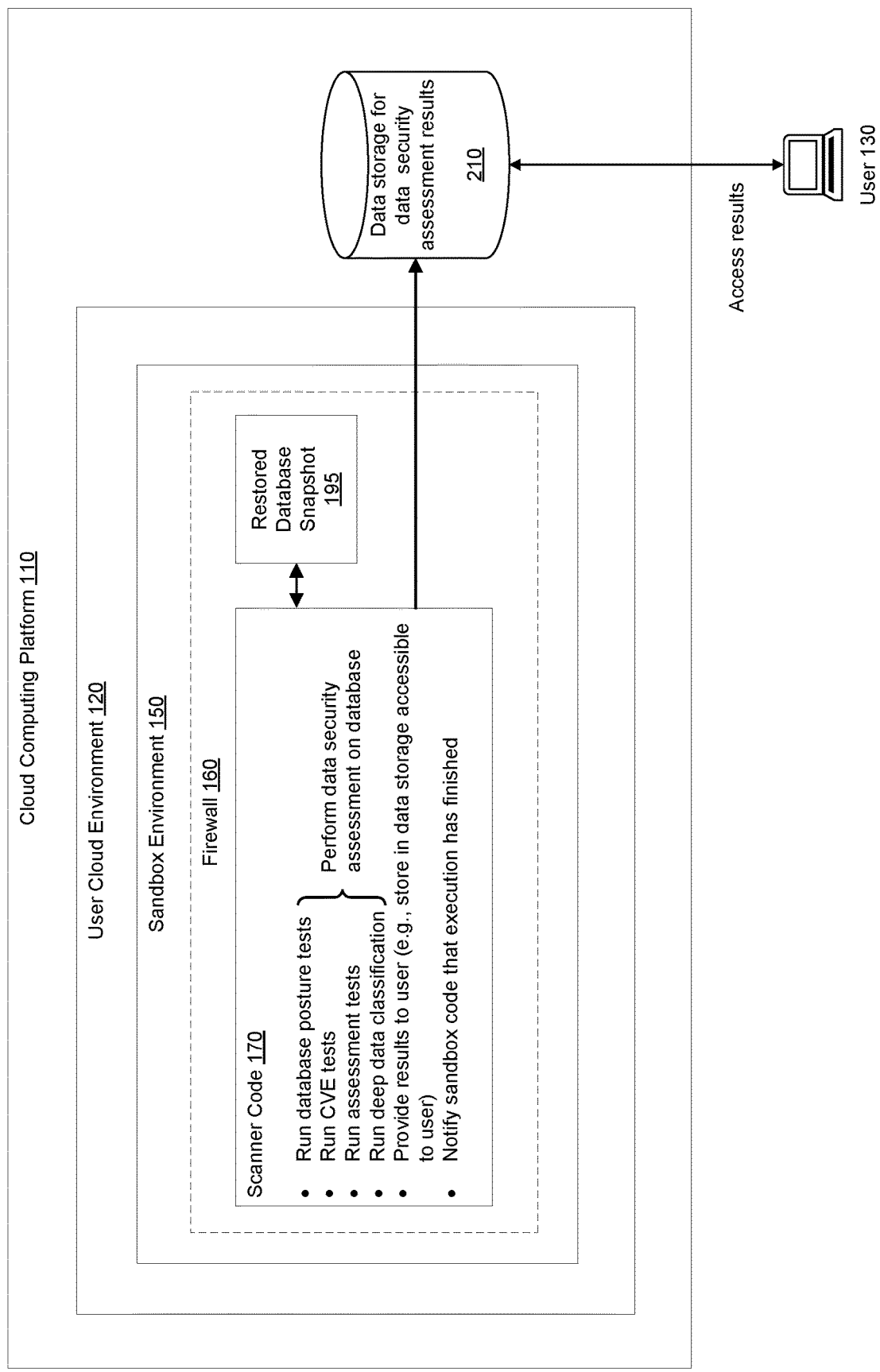
FIG. 2 is a block diagram showing an example of scanner code, according to some embodiments.

Also, as shown in the diagram, the sandbox code 140 includes code for loading scanner code 170 in the sandbox environment 150. FIG. 2 shows an example of the scanner code 170 in accordance with some embodiments. As shown in FIG. 2, the scanner code 170 includes computer code for performing a data security assessment on a database. In one embodiment, performing the data security assessment may involve running database posture tests, running CVE tests, running assessment tests via direct database queries, running a deep data classification algorithm, and/or running other types of tests/assessments/analysis to assess the data security of a database (e.g., assessing the access control of the database by inspecting user permission settings of the database).

As shown in the diagram, the scanner code 170 further includes code for providing the results of performing the data security assessment to the user 130. In one embodiment, the results of performing the security assessment of the database are provided to the user 130 by storing the results in a data storage 210 (e.g., an Amazon S3 bucket) in the cloud computing platform 110 that is accessible to the user 130.

As shown in the diagram, the scanner code 170 further includes code for notifying the sandbox code 140 that the scanner code 170 has finished execution. As will be described in additional detail herein, notifying the sandbox code 140 that the scanner code 170 has finished execution allows the sandbox code 140 to know when it is safe to tear down the sandbox environment 150.

Now referring to FIG. 1, as shown in the diagram, the sandbox code 140 also includes code for loading and restoring a snapshot of a database 180 (e.g., loading and restoring one of the database snapshot 190A-C into a running instance) in the sandbox environment 150 to create a restored database snapshot 195 and setting a unique password for admin access to the restored database snapshot 195. As mentioned above, a managed database service may automatically create database snapshots 190 for backup and recovery purposes. Thus, in some embodiments, the database snapshots 190 may already exist in the user cloud environment 120 and can be obtained via the managed database service. In embodiments where the database snapshots 190 do not already exist, a snapshot of the database 180 may be taken. The particular snapshot that is to be loaded and restored in the sandbox environment 150 can be specified by the user 130 or automatically selected/discovered (e.g., automatically select the most recent snapshot).

Also, as shown in the diagram, the sandbox code 140 includes code for executing the scanner code 170 in the sandbox environment 150 to perform the data security assessment on the restored database snapshot 195 running in the sandbox environment 150. In one embodiment, the scanner code 170 is executed in a "serverless" manner (e.g., using a serverless computing service such as Amazon Lambda).

Also, as shown in the diagram, the sandbox code 140 includes code for tearing down the sandbox environment 150 in response to a determination that the scanner code 170 has finished execution (e.g., based on receiving such notification from the scanner code 170).

Thus, execution of the sandbox code 140 may result in creating a sandbox environment 150 in the user cloud environment 120 that includes the scanner code 170 and the restored database snapshot 195 (e.g., a running instance of database snapshot 190A), which are protected by the firewall 160. Execution of the sandbox code 140 may further result in executing the scanner code 170 in the sandbox environment 150. Execution of the scanner code 170 may result in performing a data security assessment on the restored database snapshot 195 (e.g., with direct access to the restored database snapshot 195 so the scanner code has full access to actual data, system tables, security roles, database users, etc.), storing the results of performing the data security assessment in the data storage 210 so that the results can be accessed by the user 130, and notifying the sandbox code 140 when execution has finished. Execution of the sandbox code 140 may further result in tearing down the sandbox environment 150 in response to a determination that the scanner code 170 has finished execution.

An advantage of embodiments is that they perform a data security assessment in a secure sandbox environment in the user's cloud environment, thereby avoiding or reducing the outside exposure of the user's data. Also, embodiments perform a data security assessment on a restored snapshot of the database instead of on the production version of the database, which helps ensure that the production database is not harmed (e.g., accidentally or maliciously) and minimizes the impact on the performance of the production database. Another advantage of embodiments is that they are able to perform a "deep" database scan because they have access to the entire restored snapshot of the database (e.g., in contrast to existing approaches that rely on the information exposed by an API of the database).

In one example use case, a security vendor may provide sandbox code 140 to a potential customer to demonstrate its data security assessment capabilities to the potential customer without accessing the potential customer's production database and with the assurance that the data security assessment will be performed in a secure sandbox environment using the potential customer's cloud service account. An advantage here is that the potential customer is much more likely to allow the security vendor to demonstrate its capabilities if the potential customer is assured that its production databases will not be accessed directly and that the data security assessment will be performed in a secure environment that is under the control of the potential customer.

Figure 3:
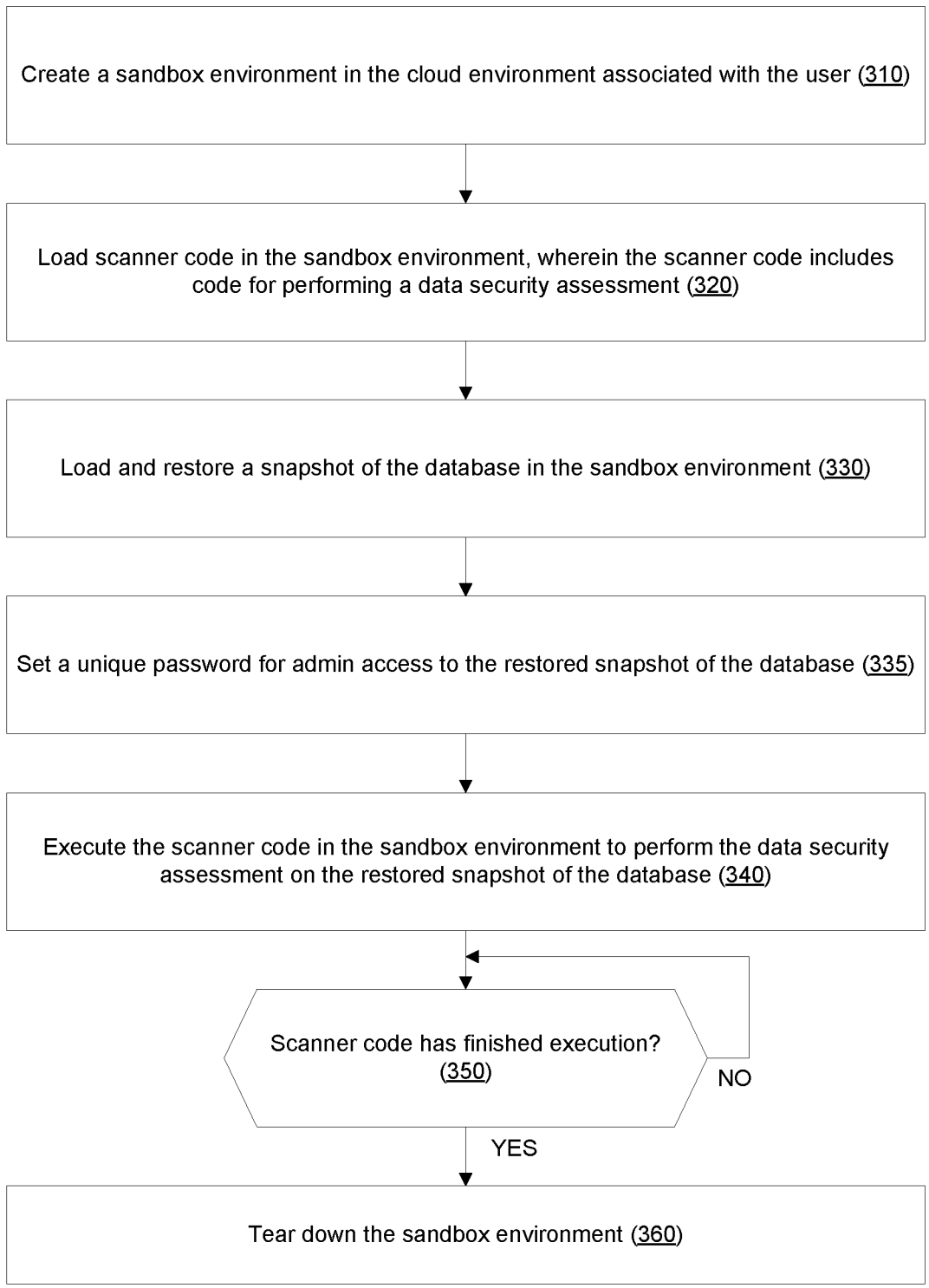
FIG. 3 is a flow diagram of an overall process for assessing the data security of a database, according to some embodiments.

FIG. 3 is a flow diagram of an overall process for assessing the data security of a database, according to some embodiments. In one embodiment, the process is implemented by a cloud computing platform (e.g., cloud computing platform 110, which includes one or more computer/electronic devices that can execute sandbox code 140, which causes the cloud computing platform 110 to perform one or more operations of the process) of a cloud service to assess a data security of a database (e.g., database 180) deployed in a cloud environment (e.g., user cloud environment 120) associated with a user (e.g., user 130) of the cloud service. The process may be implemented as part of executing sandbox code 140. The process may be implemented using hardware, software, firmware, or any combination thereof.

The operations in the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference these other diagrams can perform operations different than those discussed with reference to the flow diagrams.

Also, while the flow diagrams in the figures show a particular order of operations performed by certain embodiments, it should be understood that such order is provided merely as an example (other embodiments may perform the operations in a different order, combine certain operations, overlap certain operations, etc.).

At block 310, the cloud computing platform creates a sandbox environment in the cloud environment associated with the user. In one embodiment, the cloud computing platform configures security permissions and network access for the sandbox environment, wherein the sandbox environment includes a firewall that is configured to block network access to a public network (e.g., block network access to/from the internet) and/or routing tables that only allows network traffic to flow inside the sandbox environment (e.g., so that objects outside of the sandbox cannot access objects inside the sandbox environment). In one embodiment, the sandbox environment is a virtual private cloud. In one embodiment, the sandbox environment is created based on executing sandbox code in the cloud environment associated with the user using a cloud service account associated with the user.

At block 320, the cloud computing platform loads scanner code in the sandbox environment, wherein the scanner code includes code for performing a data security assessment. In one embodiment, the code for performing the data security assessment includes code for one or more of running database posture tests, running CVE tests, running assessment tests via direct database queries, and running a data classification algorithm. In one embodiment, the scanner code further includes code for storing results of performing the data security assessment in a data storage in the cloud computing platform that is accessible to the user. In one embodiment, the scanner code further includes code for indicating that the scanner code has finished execution.

At block 330, the cloud computing platform loads and restores a snapshot of the database in the sandbox environment. In one embodiment, the snapshot of the database is one of a plurality of snapshots of the database created by the cloud service to backup and restore the database. By restoring the snapshot of the database in the sandbox environment, the scanner code may be the only object that has network access to the restored snapshot of the database.

At block 335, the cloud computing platform sets a unique password for admin access to the restored snapshot of the database in the sandbox environment.

At block 340, the cloud computing platform executes the scanner code in the sandbox environment to perform the data security assessment on the restored snapshot of the database. In one embodiment, executing the scanner code involves the operations shown in FIG. 4.

At block 350, the cloud computing platform determines whether the scanner code has finished execution. If not, the cloud computing platform continues to wait until the scanner code has finished execution. If the cloud computing platform determines that the scanner code has finished execution (e.g., based on receiving an indication from the scanner code that it has finished execution), then at block 360, the cloud computing platform tears down the sandbox environment.

Figure 4:
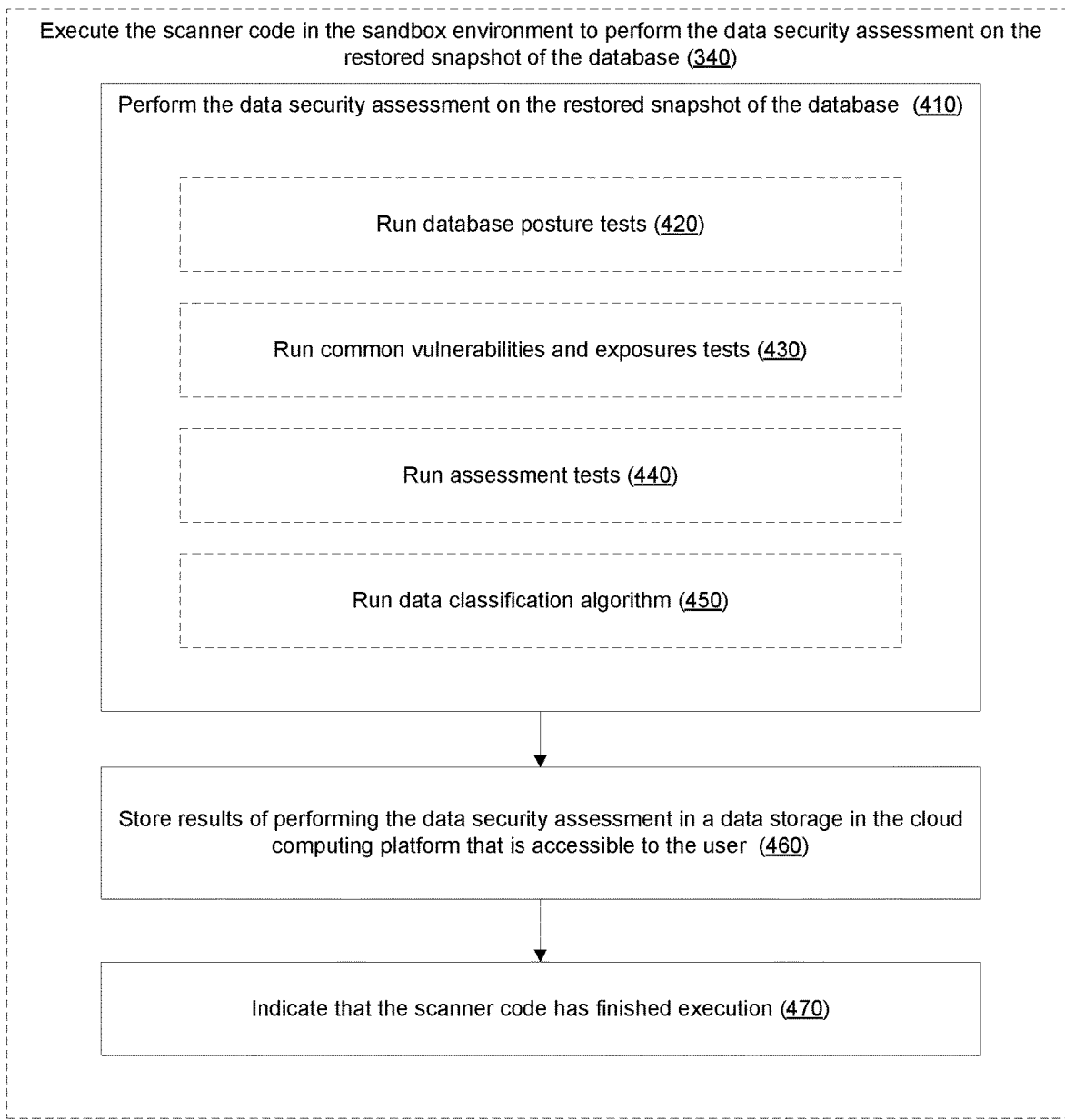
FIG. 4 is a flow diagram of a process for performing a data security assessment and associated operations, according to some embodiments.

FIG. 4 is a flow diagram of a process for performing a data security assessment and associated operations, according to some embodiments. In one embodiment, the process is implemented by a cloud computing platform of a cloud service (e.g., as part of performing the operation of block 340 of FIG. 3). The process may be implemented using hardware, software, firmware, or any combination thereof.

At block 410, the cloud computing platform performs the data security assessment on the restored snapshot of the database. This may involve, for example, running database posture tests (block 420), running CVE tests (block 430), running assessments tests via direct database queries (block 440), and/or running a data classification algorithm (block 450).

At block 460, the cloud computing platform stores results of performing the data security assessment in a data storage in the cloud computing platform that is accessible to the user (or otherwise provides the results to the user).

At block 470, the cloud computing platform indicates that the scanner code has finished execution. As mentioned above, this may allow the sandbox code to know when it is safe to tear down the sandbox environment.

Thus far, embodiments have been described herein in the context of assessing the data security of a database deployed in the cloud. However, embodiments are not so limited. As will be described in additional detail herein, the techniques described herein may be used in other contexts and/or for other purposes.

For example, the techniques described herein can be used by a software vendor to demonstrate the functionality of their software product or provide a proof of concept of their software product to a potential (or existing) customer, where the software product depends on being able to access data stored in one or more databases. A software vendor may encounter various problems/issues when trying to demonstrate functionality of their software product to a potential customer. For example, the software vendor may encounter access issues (e.g., the software vendor may not be able to access the potential customer's data store because of network access issues, lack of user permissions, and/or even lack of a user), data issues (e.g., the data that is available is nonsense "test data" that does not replicate production data in volume, consistency, variety, and/or other attribute), and/or deployment issues (e.g., setting up a new data store may require enlisting the help of various personnel within the potential customer's organization and/or require certain expertise or authority).

An existing technique to demonstrate functionality of a software product is to perform the demonstration on the potential customer's production servers, which introduces privacy and availability risks into the potential customer's production environment. Another existing technique to demonstrate functionality of a software product is to create a replica of a production system (as a "test system") and perform the demonstration on the test system, but this has access and deployment issues.

Embodiments may use the sandboxing and database snapshotting/restoration techniques described herein to demonstrate the functionality of a software product to a potential customer in a secure manner (e.g., inside a secure sandbox within the potential customer's cloud environment) while having access to realistic data (e.g., restored snapshots of the user's production databases). For example, the software vendor may provide sandbox code to a user of a cloud service (e.g., where the user may be a potential customer of the software vendor). The user may execute the sandbox code in the user's cloud environment (e.g., using the user's cloud service account). Execution of the sandbox code may involve creating a secure sandbox environment in the user's cloud environment (where the sandbox environment is configured such that it has no/limited network access to a public network such as the internet and such that no objects/appliances or only certain objects/appliances outside of the sandbox environment can communicate with objects inside the sandbox environment), loading code in the sandbox environment for performing data access functionality of the software vendor's software product ("demonstration" code), loading and restoring a snapshot of one or more databases in the sandbox environment, executing the code in the sandbox environment to perform the data access functionality of the software product, where performing the data access functionality involves accessing the restored snapshots of the one or more databases, and tearing down the sandbox environment when it is no longer needed (e.g., after the demonstration is finished). This technique may be particularly suitable for demonstrating the functionality of a software product that depends heavily on accessing data stored in one or more databases and works better when it has access to data that is as close as possible to production data. For example, the technique may be used to demonstrate the functionality of a database activity monitor (DAM) product. The technique described herein can be used to deploy a DAM in the sandbox environment. Database users may be created that attempt to access one or more restored snapshots of databases (e.g., using queries that were previously sent in a production environment) to demonstrate how the DAM protects the databases. It should be noted that since restored snapshots are being used in a secure sandbox environment, even data altering commands/queries can be sent without affecting the production environment. In one embodiment, the technique described herein can be used for quality assurance purposes (e.g., to test a piece of code that depends on having access to data stored in a database).

Figure 5:
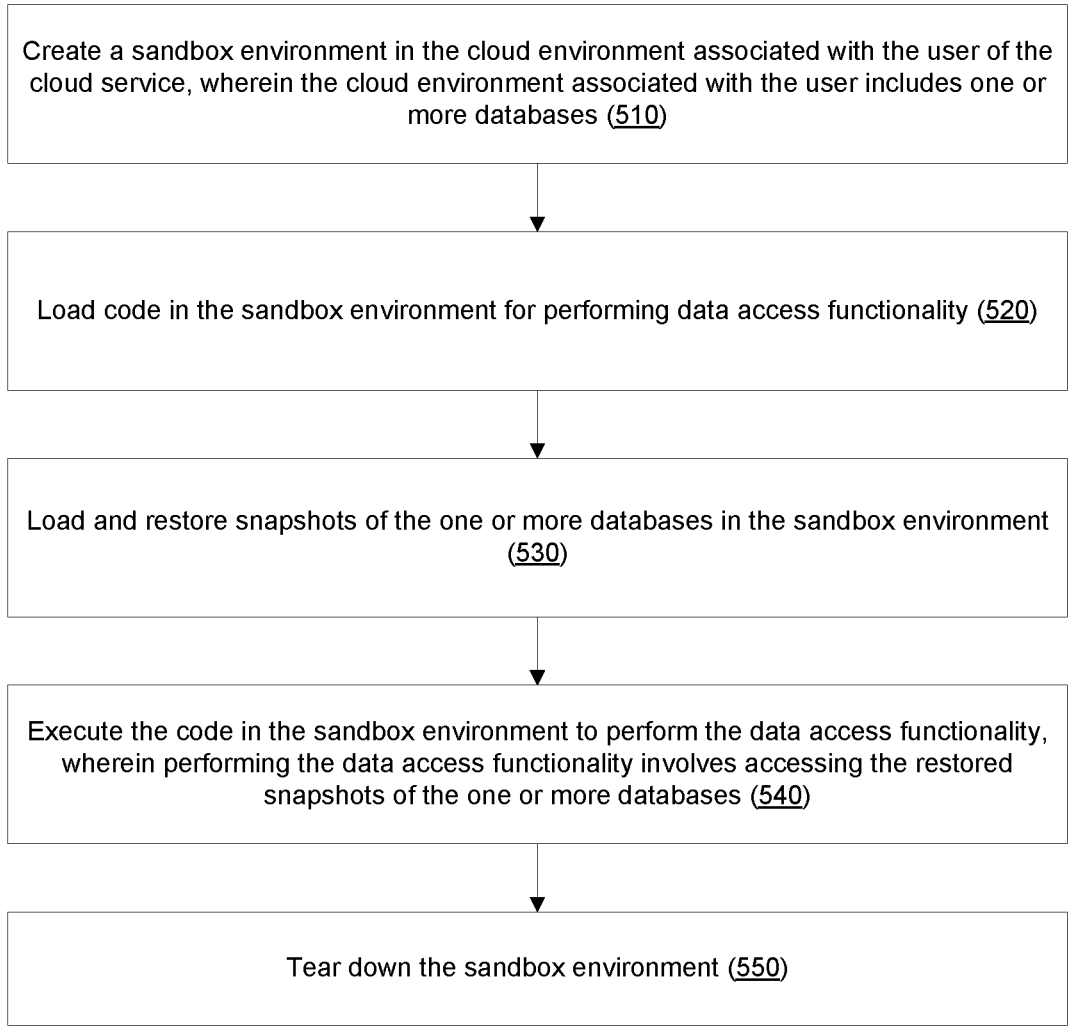
FIG. 5 is a flow diagram of an overall process for executing code for performing data access functionality in a secure sandbox environment, according to some embodiments.

FIG. 5 is a flow diagram of an overall process for executing code for performing data access functionality in a secure sandbox environment, according to some embodiments. In one embodiment, the process is implemented by a cloud computing platform (e.g., cloud computing platform 110, which includes one or more computer/electronic devices that can execute sandbox code 140, which causes the cloud computing platform 110 to perform one or more operations of the process) of a cloud service. The process may be implemented as part of executing sandbox code (e.g., the sandbox code may be provided by a software vendor to a potential customer to demonstrate the functionality of the software vendor's software product). The process may be implemented using hardware, software, firmware, or any combination thereof.

At block 510, the cloud computing platform creates a sandbox environment in a cloud environment associated with a user of the cloud service, wherein the cloud environment associated with the user includes one or more databases.

At block 520, the cloud computing platform loads code in the sandbox environment for performing data access functionality.

At block 530, the cloud computing platform loads and restores snapshots of the one or more database in the sandbox environment.

At block 540, the cloud computing platform executes the code in the sandbox environment to perform the data access functionality, wherein performing the data access functionality involves accessing the restored snapshots of the one or more databases.

At block 550, the cloud computing platform tears down the sandbox environment after the demonstration is finished.

In one example use case, the operations of the flow diagram are performed as a result of executing sandbox code provided to the user by a software vendor. The software vendor may have provided the sandbox code to the user to demonstrate the functionality of its software product to the user.

Figure 6:
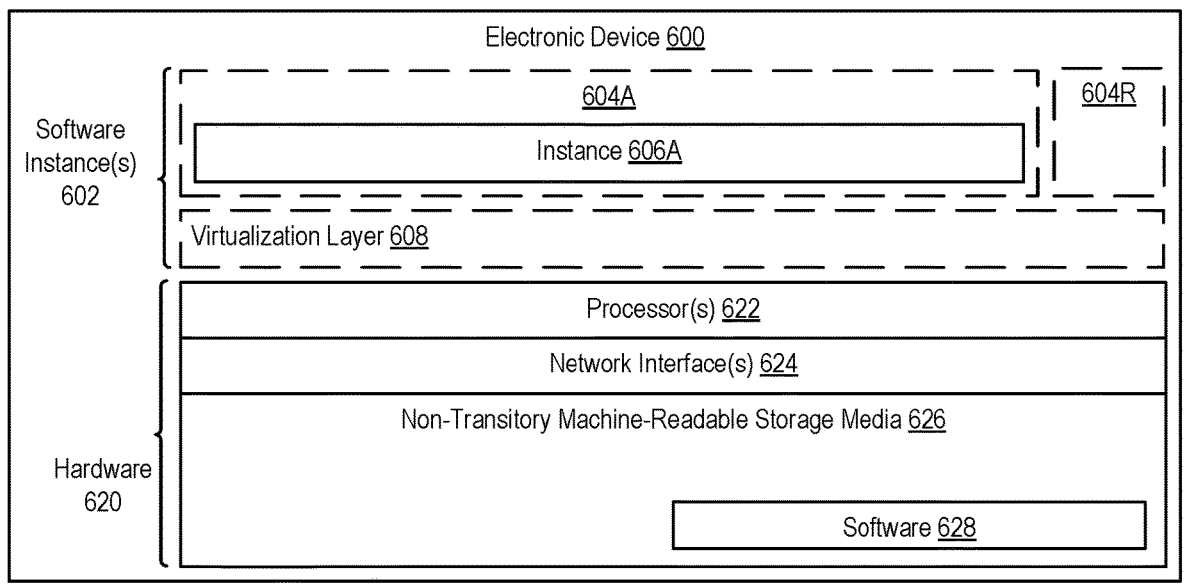
FIG. 6 is a block diagram illustrating an electronic device, according to some embodiments.

FIG. 6 is a block diagram illustrating an electronic device, according to some embodiments. FIG. 6 illustrates hardware 620 comprising a set of one or more processor(s) 622, a set of one or more network interfaces 624 (wireless and/or wired), and non-transitory machine-readable storage medium/media 626 having stored therein software 628 (which includes instructions executable by the set of one or more processor(s) 622). Software 628 can include code, which when executed by hardware 620, causes the electronic device 600 to perform operations of one or more embodiments described herein (e.g., operations for assessing data security of a database deployed in the cloud using a secure sandbox environment). The cloud computing platform 110 may include one or more electronic/network devices.

In electronic devices that use compute virtualization, the set of one or more processor(s) 622 typically execute software to instantiate a virtualization layer 608 and software container(s) 604A-R (e.g., with operating system-level virtualization, the virtualization layer 608 represents the kernel of an operating system (or a shim executing on a base operating system) that allows for the creation of multiple software containers 604A-R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 628 (illustrated as instance 606A) is executed within the software container 604A on the virtualization layer 608. In electronic devices where compute virtualization is not used, the instance 606A on top of a host operating system is executed on the "bare metal" electronic device 600. The instantiation of the instance 606A, as well as the virtualization layer 608 and software containers 604A-R if implemented, are collectively referred to as software instance(s) 602.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims (or example embodiments). For example, while embodiments have been primarily described in terms of URL paths, some embodiments may apply a similar technique to other types of structured names/addresses. The description is thus to be regarded as illustrative instead of limiting.

The invention claimed is:

1. A method performed by a cloud computing platform of a cloud service to assess a data security of a database deployed in a cloud environment associated with a user of the cloud service, the method comprising:
   creating a sandbox environment in the cloud environment associated with the user;
   configuring security permissions and network access for the sandbox environment, wherein the sandbox environment includes a routing table and a firewall that is configured to block network access to a public network;
   loading scanner code in the sandbox environment, wherein the scanner code includes code for performing a data security assessment;
   loading and restoring a snapshot of the database in the sandbox environment, wherein the snapshot of the database represents a state of the database;
   setting a unique password for admin access to the restored snapshot of the database;
   executing the scanner code in the sandbox environment to perform the data security assessment on the restored snapshot of the database; and tearing down the sandbox environment in response to a determination that the scanner code has finished execution.

2. The method of claim 1, wherein the snapshot of the database is one of a plurality of snapshots of the database created by the cloud service to backup and restore the database.

3. The method of claim 1, wherein the sandbox environment is a virtual private cloud.

4. The method of claim 1, wherein the code for performing the data security assessment includes code for one or more of running database posture tests, running common vulnerabilities and exposures (CVE) tests, running assessment tests via direct database queries, and running a data classification algorithm.

5. The method of claim 1, wherein the scanner code further includes code for storing results of performing the data security assessment in a data storage in the cloud computing platform that is accessible to the user.

6. The method of claim 5, wherein the scanner code further includes code for indicating that the scanner code has finished execution.

7. The method of claim 1, wherein the sandbox environment is created based on executing sandbox code in the cloud environment associated with the user using a cloud service account associated with the user.

8. A set of one or more non-transitory machine-readable storage media storing instructions which, when executed by one or more processors of a cloud computing platform of a cloud service, causes the cloud computing platform to perform operations for assessing a data security of a database deployed in a cloud environment associated with a user of the cloud service, the operations comprising:
   creating a sandbox environment in the cloud environment associated with the user;
   configuring security permissions and network a access for the sandbox environment, wherein the sandbox environment includes a routing table and a firewall that is configured to block network access to a public network;
   loading scanner code in the sandbox environment, wherein the scanner code includes code for performing a data security assessment;
   loading and restoring a snapshot of the database in the sandbox environment, wherein the snapshot of the database represents a state of the database;
   setting a unique password for admin access to the restored snapshot of the database;
   executing the scanner code in the sandbox environment to perform the data security assessment on the restored snapshot of the database; and
   tearing down the sandbox environment in response to a determination that the scanner code has finished execution.

9. The set of one or more non-transitory machine-readable storage media of claim 8, wherein the snapshot of the database is one of a plurality of snapshots of the database created by the cloud service to backup and restore the database.

10. The set of one or more non-transitory machine-readable storage media of claim 8, wherein the sandbox environment is a virtual private cloud.

11. The set of one or more non-transitory machine-readable storage media of claim 8, the code for performing the data security assessment includes code for one or more of running database posture tests, running common vulnerabilities and exposures (CVE) tests, running assessment tests via direct database queries, and running a data classification algorithm.

12. The set of one or more non-transitory machine-readable storage media of claim 8, wherein the scanner code further includes code for storing results of performing the data security assessment in a data storage in the cloud computing platform that is accessible to the user.

13. A computing device to be included in a cloud computing platform of a cloud service to assess a data security of a database deployed in a cloud environment associated with a user of the cloud service, the computing device comprising:
   one or more processors; and
   a non-transitory machine-readable storage medium having instructions stored therein, which when executed by the one or more processors, causes the computing device to:
      create a sandbox environment in the cloud environment associated with the user;
      configuring security permissions and network access for sandbox environment, wherein the sandbox environment includes a routing table and a firewall that is configured to block network access to a public network;
      load scanner code in the sandbox environment, wherein the scanner code includes code for performing a data security assessment;
      load and restore a snapshot of the database in the sandbox environment, wherein the snapshot of the database represents a state of the database;
      set a unique password for admin access to the restored snapshot of the database;
      execute the scanner code in the sandbox environment to perform the data security assessment on the restored snapshot of the database; and
      tear down the sandbox environment in response to a determination that the scanner code has finished execution.

14. The computing device of claim 13, wherein the sandbox environment is a virtual private cloud.

15. The computing device of claim 13, wherein the code for performing the data security assessment includes code for one or more of running database posture tests, running common vulnerabilities and exposures (CVE) tests, running assessment tests via direct database queries, and running a data classification algorithm.

16. A method performed by a cloud computing platform of a cloud service, the method comprising:
   creating a sandbox environment in a cloud environment associated with a user of the cloud service, wherein the cloud environment associated with the user includes one or more databases;
   configuring security permissions and network access for the sandbox environment, wherein the sandbox environment includes a routing table and a firewall that is configured to block network access to a public network;
   loading code in the sandbox environment for performing data access functionality;
   loading and restoring snapshots of the one or more databases in the sandbox environment, wherein each snapshot of the one or more databases represents a state of the corresponding database;

executing the code in the sandbox environment to perform the data access functionality, wherein performing the data access functionality involves accessing the restored snapshots of the one or more databases; and tearing down the sandbox environment.

17. The method of claim 16, wherein the sandbox environment is a virtual private cloud.

\* \* \* \* \*